United States Patent [19]

Bruce

[11] Patent Number: 5,244,162
[45] Date of Patent: Sep. 14, 1993

[54] METHOD AND APPARATUS FOR PROVIDING UNIFORM THICKNESS ROLLS OF GASKET MATERIAL

[75] Inventor: Paul C. Bruce, St. Louis, Mo.

[73] Assignee: Automated Gasket Corp., Kirkwood, Mo.

[21] Appl. No.: 839,406

[22] Filed: Feb. 20, 1992

[51] Int. Cl.$^5$ ............................................. B65H 35/04
[52] U.S. Cl. ................................... 242/56 R; 242/56.4
[58] Field of Search ............... 242/56 R, 56.2, 56.3, 242/56.4, 56.7, 56 B, 56.1, 67.2; 83/56; 33/501.02, 501.03

[56] References Cited

U.S. PATENT DOCUMENTS

| | | |
|---|---|---|
| 2,693,233 | 11/1954 | Seidman . |
| 3,122,956 | 3/1964 | Jucker . |
| 3,247,596 | 4/1966 | Hintermaier . |
| 3,318,180 | 5/1967 | Bauman et al. . |
| 3,371,568 | 3/1968 | Felix . |
| 3,560,123 | 4/1971 | Sekino et al. . |
| 3,796,094 | 3/1974 | Cook et al. . |
| 3,803,908 | 4/1974 | Endo et al. . |
| 4,085,638 | 4/1978 | Fifer . |
| 4,238,082 | 12/1980 | Lund ............................ 242/56.7 |
| 4,358,895 | 11/1982 | Michaud et al. ............. 33/501.02 |
| 4,550,887 | 11/1985 | Schonmeier ................. 242/56.3 |
| 4,700,486 | 10/1987 | Puumalainen ............... 33/501.03 |
| 4,749,140 | 6/1988 | Ruff ............................. 242/56.4 |
| 4,809,574 | 3/1989 | Cremona . |
| 4,813,147 | 3/1989 | Boyd ........................... 33/501.03 |
| 5,065,527 | 11/1991 | Shaw ........................... 33/747 |
| 5,190,233 | 3/1993 | Nelson ......................... 242/56 R |

Primary Examiner—William A. Cuchlinski, Jr.
Assistant Examiner—William C. Dowling
Attorney, Agent, or Firm—Robbins & Robbins

[57] ABSTRACT

A method and apparatus for slitting and separating a wide roll of gasket material of varying thicknesses into narrower rolls of uniform thicknesses. A wide roll of gasket material is slit into a plurality of narrow rolls. Each roll is passed under a roller at a pressure simulating the working load pressure of the gasket. A thickness gauge and probe is employed to determine thickness of the material as it passes between the rollers. The web of material is cut when the thickness exceeds specified tolerances and the separated lengths are collated in separate rolls of uniform thickness. Gaskets are stamped or cut from the collated rolls and for quality control a gasket from a group of gaskets is measured for thickness under the simulated working load pressure. The thickness gauges employed in the rollers and quality control are calibrated against one another to ensure uniformity of measurement.

24 Claims, 2 Drawing Sheets

METHOD AND APPARATUS FOR PROVIDING UNIFORM THICKNESS ROLLS OF GASKET MATERIAL

BACKGROUND OF THE INVENTION

In the past gaskets have been employed in various fields of art to seal parts compressed together to prevent fluid leakage between the parts.

One such usage is in compressor valve plates used in air conditioners where the gasket under pressure is required to be a specific thickness in the order of 0.025 inch within strict tolerances of plus or minus 0.0005 inch under load to prevent fluid leakage and consequent loss of efficiency and damage to various parts. The gaskets employed are subjected to rigid and laborious testing procedures to ensure strict adherence to specified thicknesses under the load to be employed which may be well upwards of 1,000 PSI.

In the manufacturing process in obtaining the gaskets, wide rolls of gasket material are conventionally slit into narrower rolls of a width suitable for stamping out gaskets. Such wide rolls can vary in thickness across the width of the wide roll and in the length of the roll as it comes from the manufacturer of the roll. This is due to difficulty in quality control to meet the specific thickness requirements of certain gaskets.

To meet the specifications required for example, in the compressor industry, the manufacturer of gaskets of 0.025 inch which compress under load for example to 0.021 inch, must supply a gasket of that thickness plus or minus 0.0005 inch. To meet this requirement, each manufactured gasket is tested, for example, at 2500 PSI to determine whether the thickness is at the designated load 0.021 inch plus or minus 0.0005.

The quality control problem requires a laborious and time consuming effort which has been necessary where exact specifications are required for high quality gaskets.

SUMMARY OF THE INVENTION

By means of this invention there has been provided a method and apparatus for ensuring the uniformity and accuracy of gasket material under working load pressure.

A wide roll of gasket material which may vary in thicknesses both laterally and longitudinally of the web of material is slit into a plurality of narrower rolls. Each of the rolls is then passed separately between a pair of rollers in which one roller may be biased toward the other roller to provide a pressure upon the web in an amount simulating the working load pressure at which the final gasket to be made from the gasket material is subjected.

As the web of gasket material is passed between the rollers the thickness of gasket material between the rollers is measured to determine whether tolerances are exceeded. Should the thickness be less or exceed the specified thickness, the web is cut and the material previously passing through the material is separated into rolls of the same thickness. The subsequent material of greater or less thickness is passed between the rollers and is then measured in a like manner. When the thickness changes beyond the tolerances the material is cut and separated into rolls of a different thickness. In this manner the slit rolls are all measured and collated into separate thicknesses for subsequent use in manufacturing gaskets having a precise thickness under working pressure load.

The thickness is accurately measured as the web of gasket material is passed between the rollers by a thickness gauge having a probe that is responsive to the thickness of the material between the rollers and change in distance between the rollers. A counter for determining the length of each cut of gasket material is also provided for convenience in collating and separating the rolls of material measured.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
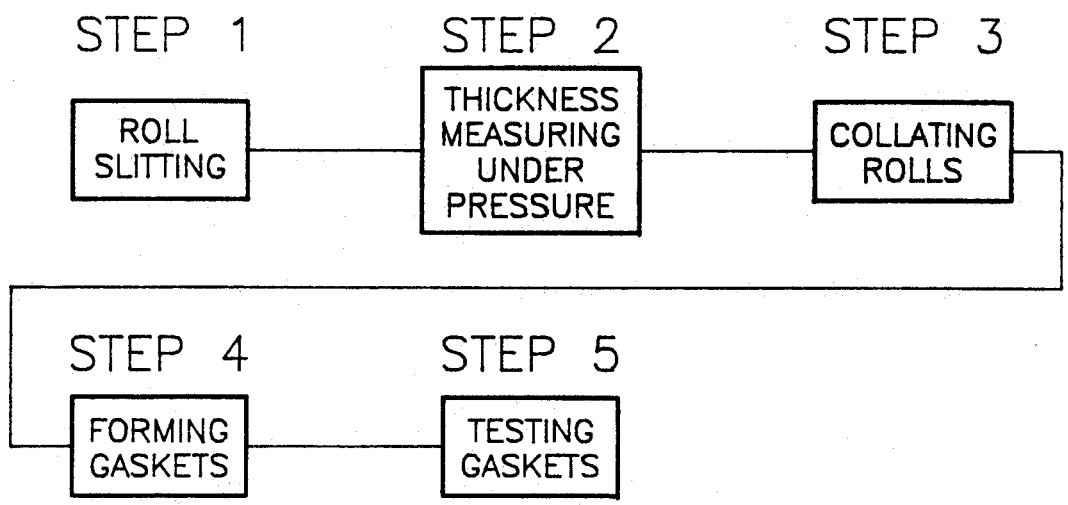
FIG. 1 is a flow sheet of the method of the invention.

The gasket material to which this invention pertains is primarily directed to the type that is produced on a Fourdrinier machine in wide rolls such as for example, 40" in width. It will be of course understood, that other types and widths of gasket materials may be employed.

The gasket material is slit into a plurality of narrower rolls, such as for example, 4" in width for ease in handling and formation into gaskets of one type or another by die cutting, stamping and the like which, per se, forms no part of this invention.

The wide rolls of gasket material, because of the nature of production and despute, care in quality control may vary slightly in thickness across the width of the material as well as across the length of the material. Such variations for a raw roll of gasket material for example, 0.025" in thickness may vary as much as 0.003" in thickness, more or less, from one end of the roll to the other or between intermediate points and also across the width of the roll web. The middle portion of the web often is thicker than at the edges, in gasket material obtained from a Fourdrinier machine. Such changes in thickness are normally gradual rather than abrupt particularly across the width which is much shorter than the length of the roll.

The requirements for gasket material in various industrial practices mandate the finished gasket under working load pressure to have a precise thickness. For example, in the compressor industry, gaskets under a working load pressure, must have a compressed thickness of exactness within a tolerance typically of plus or minus 0.0005". To meet these standards, the finished gasket has in the past been required to have the thickness measured individually under working load pressure. The gaskets are then separated into individual lots having the same thickness.

The gasket material measured by this invention is directed particularly, but is not limited, to valve plates employed in compressors for air conditioners. Such gasket material typically is of a fibrous material having fillers and elastomers and a compressibility of about 16%. As an example, such a gasket may be without load of a thickness of 0.025" and compressible at 2500 PSI to 0.021". The thickness under load must be measured precisely and should not exceed a specified tolerance such as 0.0005.

Through this invention the slitted rolls of gasket material to provide the needed uniform thickness are first measured under simulated load pressure corresponding to the working load pressure well above 1,000 PSI which for example, may be 2500 PSI. The apparatus for measuring the thickness of the web or strip in the slitted roll is designated by the reference numeral 10 in FIGS. 3, 4 and 5.

The apparatus is in the nature of a roller press comprised of a stand 12 supporting a drive roller 14 and an adjustably biased roller 16. A web 18 of gasket material is fed between the rollers by the rotation of the driven roller driven by a chain 20 connected to motor 22.

The gasket material to be measured is supplied by a feed roller 24. The measured gasket material is taken up on roller 26 driven by chain 28 connected to the driven feed roller 14.

In order to measure the thickness of the web 18 as it passes between the rollers, a thickness gauge 30 is provided. The gauge has an elongated rod-like probe 32 which is biased into engagement with the roller 16 and is responsive to movement of the roller 16 toward and away from driven roller 14 due to any change in the thickness of the web as it passes between the rollers.

Figure 5:
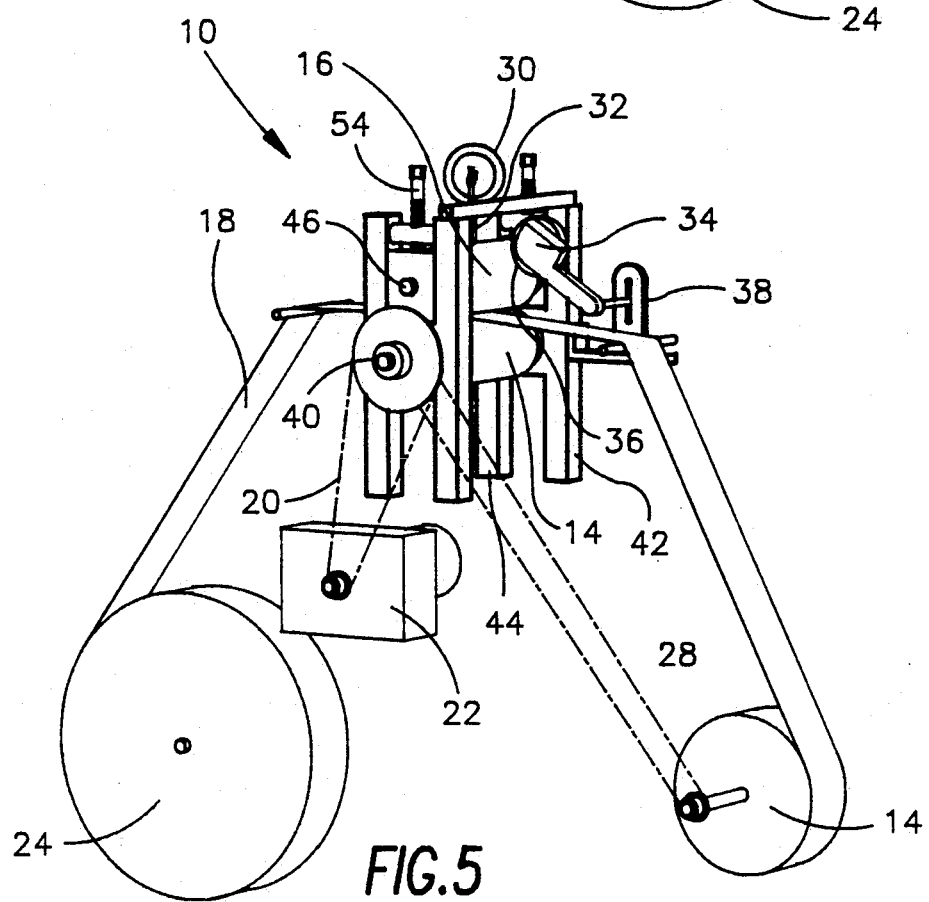
FIG. 5 is a view similar to FIG. 4 but from the rear end of the apparatus and showing the length counter.

A read-out counter 34 in the nature of a conventional odometer, as best shown in FIG. 5, is connected to a counter wheel 36 which is supported by bracket 38 in a manner to engage the wheel against the roller 16 to measure the length of the web as it passes between the rollers.

Figures 2, 3:
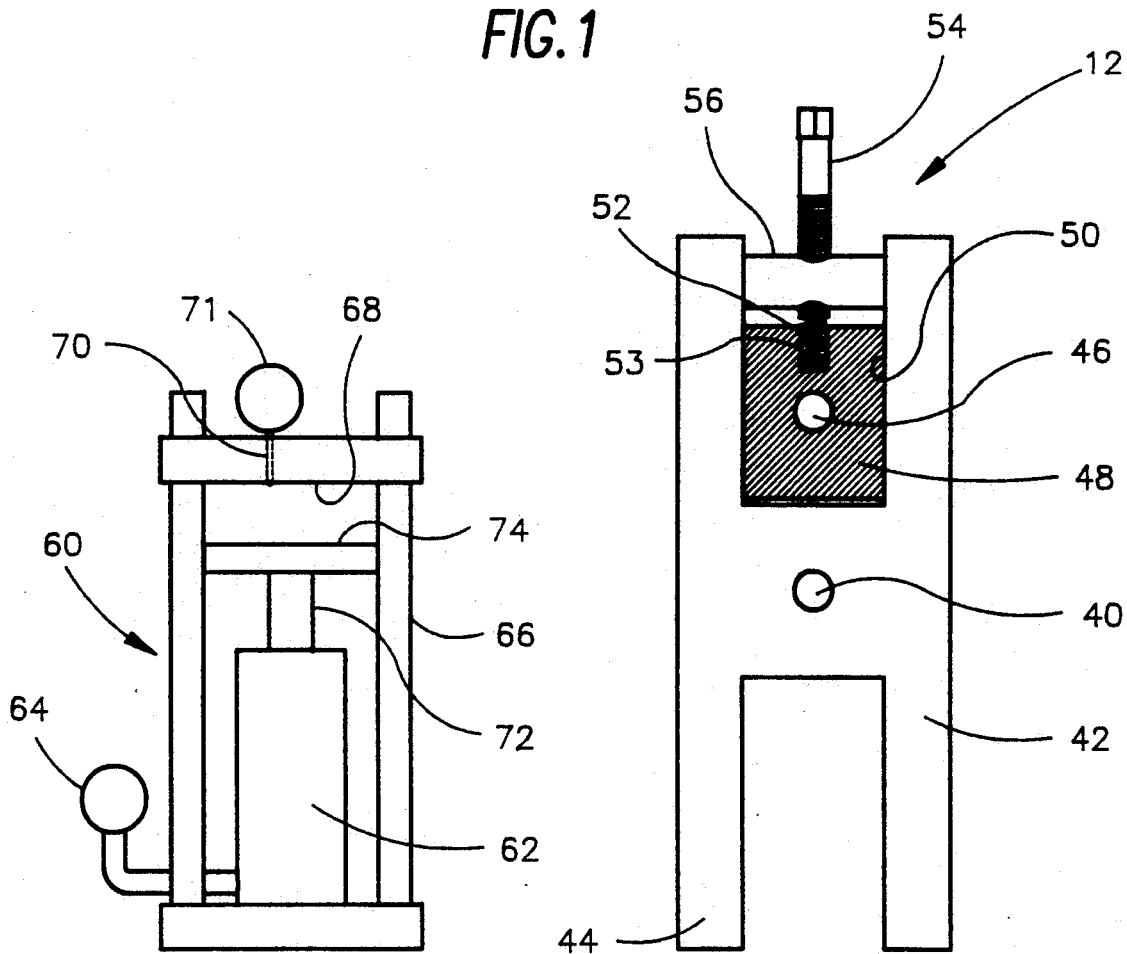
FIG. 2 is a view in elevation of a hydraulic jack press employed for measuring individual gaskets.
FIG. 3 is an end view in elevation and partly in section showing the support stand and rollers for measuring the thickness of the strip of gasket material.

The support of the rollers in the press stand is best shown in FIG. 3. An axle 40 of roller 14 is journalled in opposite H-shaped legs 42 and 44 of the support stand 12. An axle 46 of biased roller 16 is journalled in a moveable bearing block 48 slidably received in a slot 50 formed in a bifurcated upper portion of the legs 42 and 44.

The bearing block may be adjusted to provide varying biasing loads against the web 18 passing between the rollers 14 and 16 by a biasing load spring 52 received at one end in a slot 53 in the bearing block. The spring is adapted to be compressed at an opposite end by torque bolts 54 which are threadedly received in a cross bar 56 connected to the bifurcated upper portions of legs 42 and 44. By tightening or loosening the torque bolts the web 18 may be compressed to the specified deformation and thickness simulating the working load compression of a finished gasket. This determines the proper simulated working load exerted by the spring for this particular gasket material.

In order to provide calibration of the gauge 30 and the spring pressure, a reference gasket is employed. For example, a gasket or gasket material having a known thickness under no load of 0.025 inch which is compressible at 2500 PSI to 0.021 inch is inserted between the rollers 14 and 16 which are opened to receive the gasket. The torque bolts are then tightened to compress and deform the gasket to a degree where by reading the gauge 30 it is determined that the gasket has been compressed 0.004 to the specified thickness of 0.021 inch.

Calibration of the apparatus may be effected by employing the hydraulic jack press 60 shown in FIG. 2 which has been conventionally employed in the past to test individual gaskets. The jack press employs a hydraulic jack 62 having a gauge 64 from which the pressure employed may be read. The jack is supported in a frame 66 having a stationary upper platen 68 through which a probe 70 of a thickness gauge 71 protrudes. A ram 72 is connected to a platen 74 and is moveable to compress a gasket or portion of gasket material when the hydraulic jack is operated to move the platen 74 toward the platen 68 to compress the material at the desired simulated working pressure, for example 2500 PSI. The change in thickness for the specified example as read from the gauge should be 0.004" from the uncompressed gasket having a thickness of 0.025" to the compressed gasket having a thickness of 0.021". This gasket may then be used as a reference gasket in the calibration of the apparatus 10 as afore-described.

USE

The operation of the method of this invention may be simply shown by reference to the flow sheet of FIG. 1.

In Step 1, the roll of wide gasket material such as 40" wide, is slit into rolls 4" wide for example. This is effected by conventional slitting means, per se, forming no part of this invention.

Figure 4:
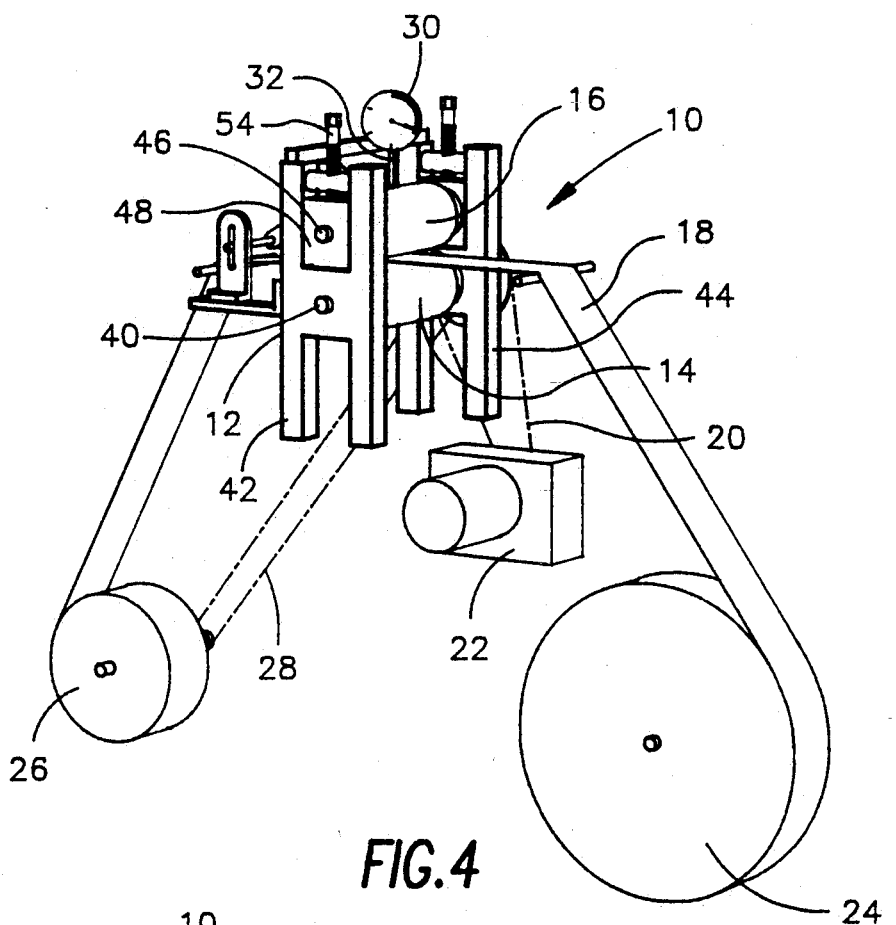
FIG. 4 is a pictorial view illustrating the end and front portion of the apparatus for measuring the thickness and length of the strip.

In Step 2, the slit rolls are separately measured for thickness and length. Separate lengths as described above in connection with the description of the apparatus 10 in FIGS. 3, 4 and 5 are cut and measured for thickness and length and wound into corresponding separate rolls.

In Step 3, the rolls are collated in separate lots having the same uniform no load and working load thickness.

In Step 4, a roll of gasket material having the desired measured uniform thickness obtained by this invention is formed into a finished gasket by stamping, pressing, die cutting or the like by conventional devices which, per se, form no part of this invention.

In Step 5, the gaskets of uniform thickness are collected in lots of 100 for example, and a gasket which may be selected at random is tested for thickness before compression and after compression in the hydraulic press 60 to determine the respective thickness. The meeting of the desired specifications ensures that the entire lot is of proper thickness to meet the required specifications. Should the gasket not meet the described thickness, the entire lot is tested and the individual gaskets may be sorted to meet appropriate specifications. In the latter situation which by means of this invention should occur only infrequently, the time spent in testing is simply that which was employed in prior practice without the use of the invention.

Various changes and modifications may be made within this invention as will be apparent to those skilled in the art. Such changes and modifications are within the scope and teaching of this invention as defined in the claims appended hereto.

What is claimed is:

1. A method for providing strips of gasket material of a uniform thickness at a selected pressure from a wide roll of gasket material having irregular thicknesses laterally and longitudinally, said method comprising slitting said wide rolls into strips, passing a selected strip under a pair of opposed rollers biased to exert said selected pressure upon said slit strip, measuring the thickness of said strip as it is passed through said rollers and severing lengths of a uniform thickness within pre-selected tolerances.

2. The method of claim 1 in which one of said rollers is adjustable toward and away from said roller to vary said selected pressure upon said strip.

3. The method of claim 1 in which the thickness of said strip as it is pressed through said rollers is measured against movement of an adjustable roller responsive to changes in thickness of said strip passing through said rollers.

4. The method of claim 3 in which said thickness is measured by contact of a thickness gauge having a probe engaging said adjustable roller.

5. The method of claim 4 in which said separated length of uniform thickness is employed to manufacture gaskets in a lot of gasket, at least one of said gaskets from the lot being subjected to quality control to determine its thickness under the pre-selected pressure and comparing said thickness to that of the strip under pressure obtained in the quality control, the thickness of said gasket being measured by a thickness gauge which is calibrated with the thickness gauge employed to measure the thickness of said strip.

6. The method of claim 1 in which the length of each of said severed strips is measured.

7. The method of claim 6 in which the measurement is effected by a wheel driven by one of said rollers and a read-out counter connected to said wheel.

8. The method of claim 6 in which said severed strips are formed into separate rolls, and said separate rolls are collected in lots having the same thicknesses within said pre-selected tolerances.

9. The method of claim 1 in which said separated length of uniform thickness is employed to manufacture gaskets in a lot of gaskets, at least one of said gaskets from the lot being subjected to quality control to determine its thickness under the pre-selected pressure and comparing said thickness to that of the strip under the pressure obtained in the quality control.

10. The method of claim 1 in which said selected pressure is determined by biasing said rollers to provide a biasing pressure to deform said strip to said uniform thickness.

11. A method for providing strips of fibrous gasket material of a uniform thickness at a selected pressure for valve plate gaskets for air compressors in air conditioners which comprises slitting said strip of gasket material from a wide roll having irregular thicknesses, passing a selected strip between a pair of opposed rollers biased to exert said selected pressure upon said slit strip, measuring the thickness of said strip as it is passed through said rollers and severing lengths of a uniform thickness within preselected tolerances.

12. The method of claim 11 in which the fibrous gasket material is compressible under a selected pressure and returns to original thickness.

13. The method of claim 11 in which said selected pressure is at least 1,000 PSI.

14. The method of claim 11 in which said selected pressure is determined by biasing said rollers to provide a biasing pressure to deform said strip to said uniform thickness.

15. The method of claim 11 in which the fibrous gasket material is compressible under pressure and returns to original thickness, said selected pressure is at least 1,000 PSI, said selected pressure is determined by biasing said rollers to providing a biasing pressure to deform said strip to said uniform thickness.

16. An apparatus for measuring the thickness of a strip of gasket material under a pre-selected load pressure simulating a working load pressure, said apparatus comprising a support for a pair of rollers receiving said strip between said rollers, means for rotating one of said rollers, biasing means for biasing a second one of said rollers against said strip under said pre-selected load pressure simulating said working load pressure as said strip is passed through said rollers, thickness measuring means for measuring the thickness of said strip as it is passed through said roller under said pre-selected load pressure, means for severing said strip when the thickness varies from a selected tolerance and means for winding said severed strip of uniform thickness in a roll.

17. The apparatus of claim 16 in which measuring means are provided for measuring the length of the strip passed through said rollers.

18. The apparatus of claim 17 in which said measuring means comprises a wheel engageable by one of said rollers and a counter connected to said wheel to provide a count corresponding to revolutions of said wheel to indicate the length of said strip.

19. The apparatus of claim 16 in which said thickness measuring means comprises a thickness gauge having a moveable member responsive to changes in thickness of said strip as it passes between said rollers.

20. The apparatus of claim 16 in which said biasing means is adjustable to provide selected pressure against a biasing spring biasing said rollers toward one another to compress said strip as it is passed between said rollers to provide said pre-selected load pressure.

21. The apparatus of claim 20 in which said support comprises a frame supporting a pair of axles journalled within said frame, said second roller being connected to one of said axles which is adjustable against said biasing means to adjust said pre-selected load pressure.

22. The apparatus of claim 21 in which said biasing means comprises a compression spring biasing the axle of said second roller toward the other roller.

23. The apparatus of claim 16 in which a moveable member is responsive to radial movement of said second roller as it moves toward or away from said first roller as thickness of the strip is varied as it passed between said rollers.

24. The apparatus of claim 23 in which said moveable member is a probe which engages a surface of said second roller in biased relation.

* * * * *